(12) United States Patent
Henderson et al.

(10) Patent No.: US 6,394,408 B1
(45) Date of Patent: *May 28, 2002

(54) TROLLING MOTOR COLUMN MOUNTING SYSTEM

(75) Inventors: William A. Henderson, Starkville; Rodney D. Davis, Tupelo, both of MS (US)

(73) Assignee: Brunswick Corporation, Lake Forest, IL (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/698,054

(22) Filed: Aug. 13, 1996

(51) Int. Cl.⁷ .................................................. F16M 1/00
(52) U.S. Cl. .......................... 248/640; 403/90; 403/128
(58) Field of Search ............... 248/640, 642, 248/288.31, 288.51, 548, 900, 295.11, 286.1; 440/56, 65; 403/109, 377, 90, 122, 128, 130, 131, 143

(56) References Cited

U.S. PATENT DOCUMENTS

| | | | | |
|---|---|---|---|---|
| 153,813 A | * | 8/1874 | Dewey | ........................ 403/131 |
| 259,957 A | * | 6/1882 | White | ..................... 403/130 X |
| 424,572 A | * | 4/1890 | Painter | .............. 248/288.51 X |
| 1,328,313 A | | 1/1920 | Borchert | |
| 1,491,233 A | | 4/1924 | Harley | |
| 1,703,099 A | * | 2/1929 | Craddock | ................ 248/642 X |
| 1,983,368 A | * | 12/1934 | Hathorn | ................... 403/122 X |
| 2,332,893 A | | 10/1943 | Clickner | |
| 2,652,221 A | * | 9/1953 | Kampa | .................... 403/131 X |
| 2,717,792 A | | 9/1955 | Pelley | |
| 2,733,085 A | * | 1/1956 | Latzen | ........................ 403/128 |
| 2,804,278 A | * | 8/1957 | Jewett | ..................... 248/411 X |
| 2,874,978 A | | 2/1959 | Stilwell | |
| 2,923,270 A | | 2/1960 | Travis, Sr. | |
| 2,972,977 A | | 2/1961 | Hausmann | |
| 2,973,738 A | | 3/1961 | Ladewig | |
| 3,003,399 A | * | 10/1961 | Donner | .................... 403/122 X |
| 3,012,798 A | * | 12/1961 | Berger | ............... 248/288.31 X |
| 3,674,228 A | | 7/1972 | Horton | |
| 3,839,986 A | | 10/1974 | Meyer et al. | |
| 3,860,271 A | | 1/1975 | Rodgers | |
| 3,978,276 A | * | 8/1976 | Poffenberger | ............ 403/130 X |
| 4,222,680 A | * | 9/1980 | Browning | ..................... 403/90 |
| 4,378,172 A | * | 3/1983 | Groschupp | .............. 248/411 X |
| 4,555,233 A | | 11/1985 | Klammer et al. | |
| 4,734,068 A | | 3/1988 | Edwards | |
| 4,982,924 A | * | 1/1991 | Havins | ................... 248/288.31 |
| 5,109,321 A | * | 4/1992 | Maglica et al. | ..... 248/288.31 X |
| 5,238,432 A | | 8/1993 | Renner | |
| 5,433,551 A | * | 7/1995 | Gordon | ................... 403/109 X |
| 5,607,136 A | * | 3/1997 | Bernloehr | .................... 248/640 |

FOREIGN PATENT DOCUMENTS

| | | | | |
|---|---|---|---|---|
| DE | 1067668 | * | 10/1959 | ............ 248/288.51 |
| JP | 478791 | | 3/1992 | |

* cited by examiner

Primary Examiner—Ramon O. Ramirez
(74) Attorney, Agent, or Firm—Steve Rosenblatt

(57) ABSTRACT

A trolling motor column is supported in a support frame by virtue of the ball and socket connection. The column passes through the ball. The ball has a bore through which the column extends. The column may be secured in different positions to the bore or a tube which extends from the bore in the ball. The support framework houses the socket which surrounds the ball. A clutch mechanism is provided to regulate the degree of force required to displace the ball within the socket. A neutral or vertical position indicator on the ball and socket is provided to easily reposition the column to near vertical after an encounter with an underwater object. As a result, the column can flex in a multiplicity of planes around a 360° circle.

11 Claims, 4 Drawing Sheets

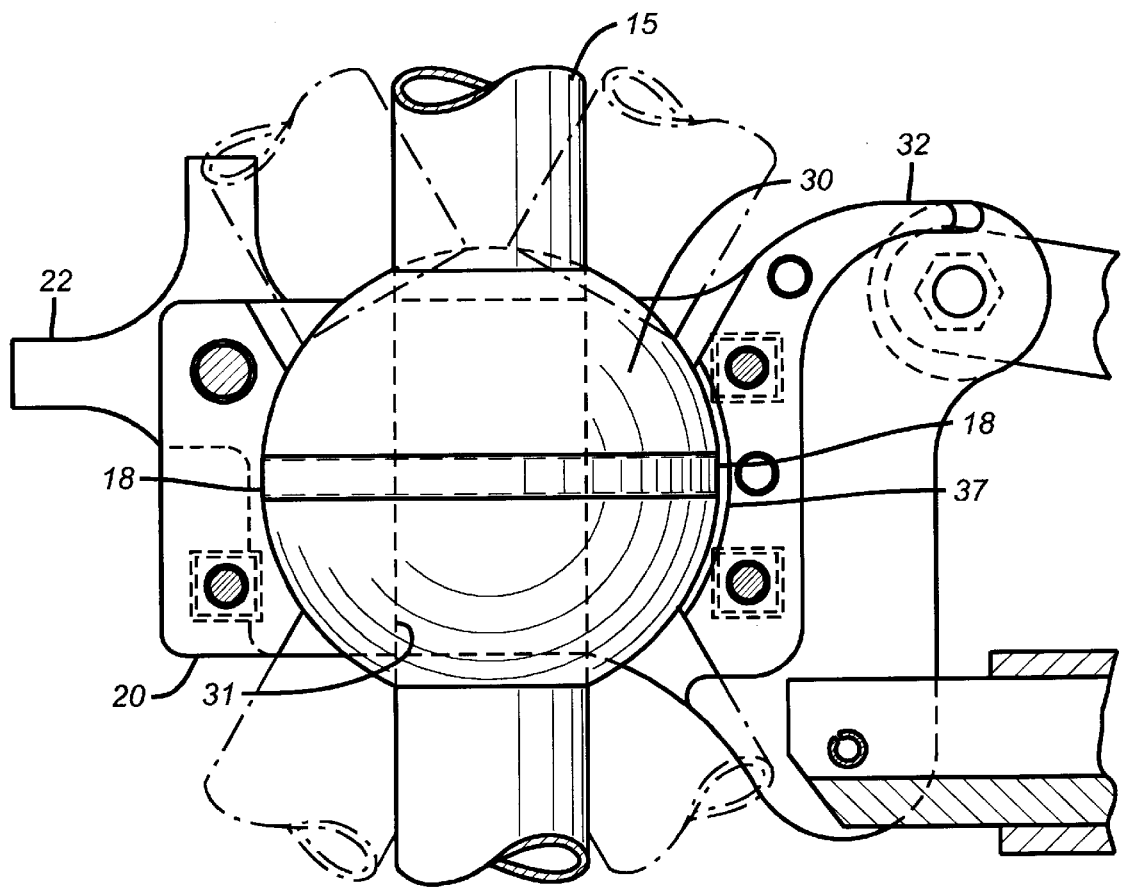
FIG. 3
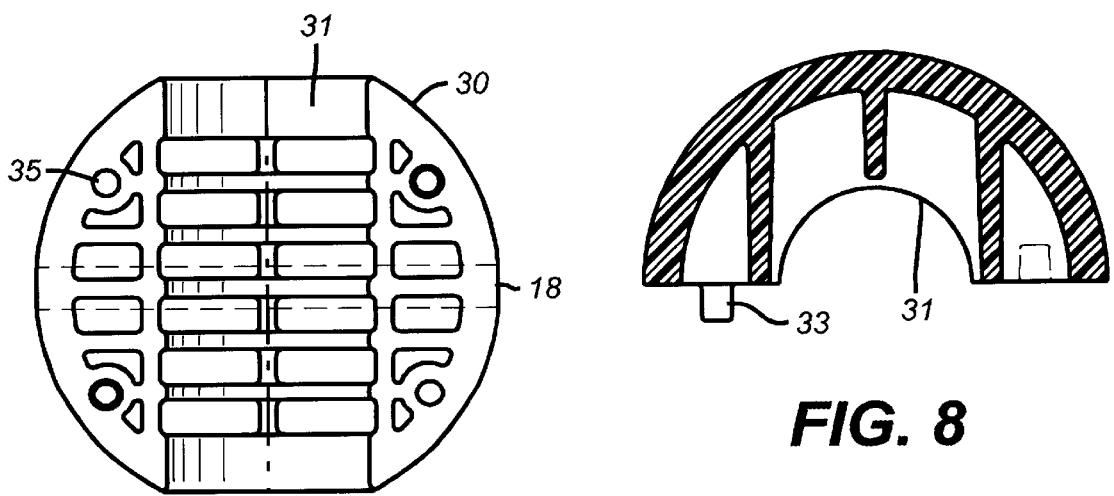
FIG. 7
FIG. 8

TROLLING MOTOR COLUMN MOUNTING SYSTEM

FIELD OF THE INVENTION

The field of this invention relates to mounts for trolling motors.

BACKGROUND OF THE INVENTION

Fisherman frequently use trolling motors for repositioning a boat or holding its position within a fairly narrowly defined area in which the fisherman has determined to be the best spot. One of the hazards in moving the boat with the trolling motor is the situation where a fixed object below the water is struck by the trolling motor. In the past, the trolling motor columns have been secured to brackets pivotally to allow the trolling motors to deflect in a single plane upon striking an underwater obstruction. A good example of this type of design is U.S. Pat. No. 4,734,068. Other designs have put a ring clamp around the column and secured the clamp to the trolling motor support structure with a flexible or shock-absorbing connection. Typical of such designs is U.S. Pat. No. 4,555,233. Yet other older designs use the universal joint in conjunction with a propeller that could be retracted and extended below the bottom of the boat. This design is illustrated in U.S. Pat. No. 1,491,233.

Other designs that are relevant to prior mountings of outboard motors or trolling motors are U.S. Pat. Nos. 3,674,228; 5,238,432; 2,923,270 and 1,328,313. Also of interest to the background of the invention are U.S. Pat. Nos. 3,839,986; 2,972,977; 2,973,738; and Japanese Patent 4-78,791. Ball joint pipe couplings are illustrated in U.S. Pat. Nos. 3,860,271, and 2,332,893.

The designs in the prior art as described above have not addressed the issue of a glancing or oblique blow to a trolling motor. Instead, as previously described, the prior designs have included the ability to move in a single plane in reaction to striking an object. While this may be sufficient if the longitudinal axis of the trolling motor is in line with the longitudinal axis of the boat so that the boat is going essentially directly forward or in reverse, there exists other occasions where the direction of movement of the boat or the shape of the underwater object results in a glancing blow to the body of the trolling motor. The prior designs described above have not been designed for this type of encounter with an underwater obstruction. Accordingly, the apparatus of the present invention has been developed to allow the trolling motor column to be displaced in any given direction. In providing such a design the present invention takes into account the operating requirements for such a device with the result being that flexibility in a multitude of planes in a 360° circle is created for the trolling motor column. A mechanism is also put in to easily indicate the neutral or vertical position for the fisherman so that the column can be restored to that position easily and quickly. The clutch mechanism controls the resistance to motion with respect to the supporting brackets. Finally, the column interacts with the support system so that the relative depth of the trolling motor can be adjustable while at the same time taking advantage of the feature of motion in a multiplicity of planes in a 360° circle.

SUMMARY OF THE INVENTION

A trolling motor column is supported in a support frame by virtue of the ball and socket connection. The column passes through the ball. The ball has a bore through which the column extends. The column may be secured in different positions to the bore or a tube which extends from the bore in the ball. The support framework houses the socket which surrounds the ball. A clutch mechanism is provided to regulate the degree of force required to displace the ball within the socket. A neutral or vertical position indicator on the ball and socket is provided to easily reposition the column to near vertical after an encounter with an underwater object. As a result, the column can flex in a multiplicity of planes around a 360° circle.

BRIEF DESCRIPTION OF THE DRAWINGS

FIG. 3 is a detailed view of the ball and socket connection illustrating the column in three different positions.

FIG. 7 is a sectional elevational view of one segment of the ball.

FIG. 8 is a plan view of the matching segment to the segment shown in FIG. 7.

DETAILED DESCRIPTION OF THE PREFERRED EMBODIMENT

Figure 1:
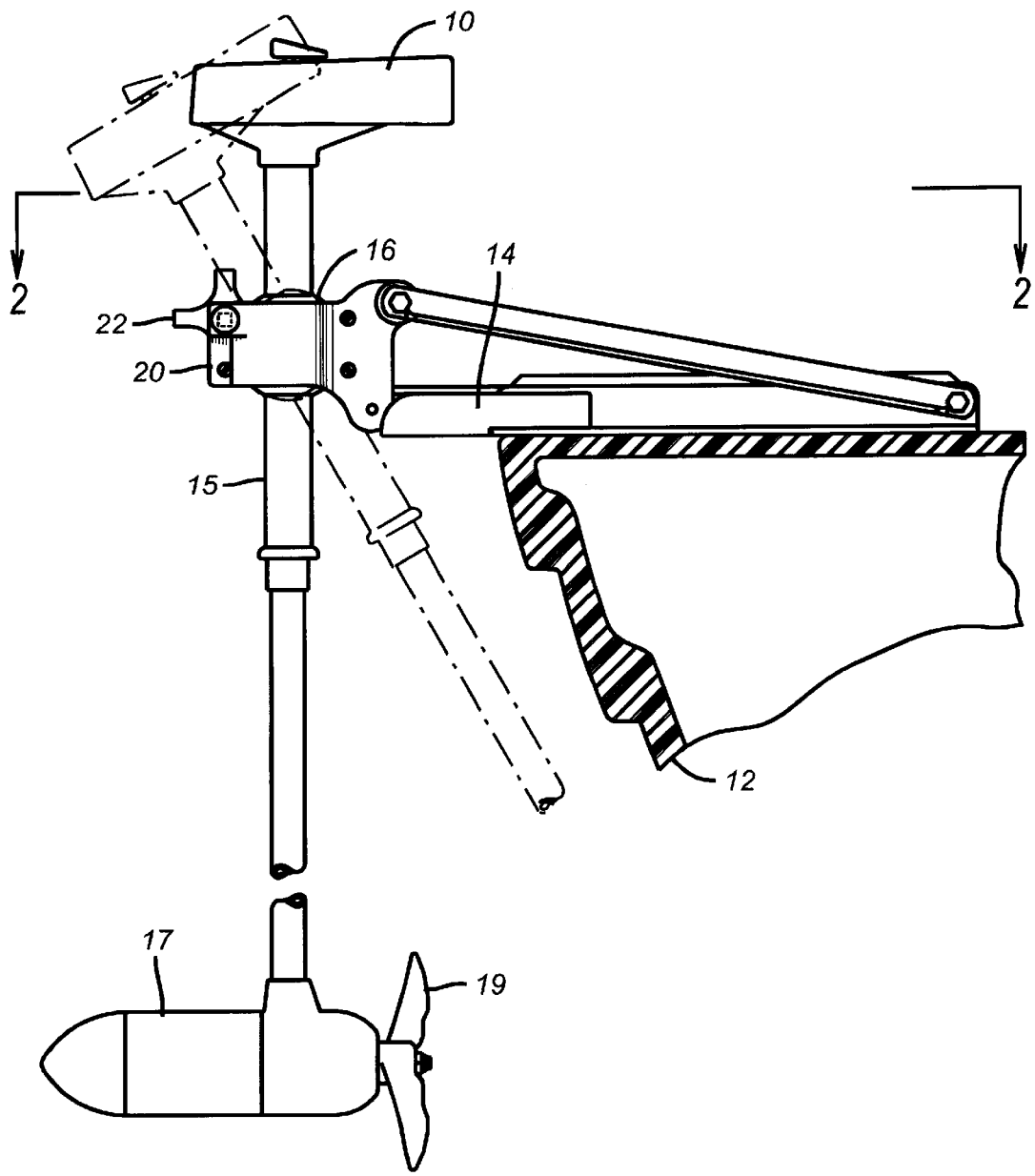
FIG. 1 is an elevational view showing the trolling motor and column in two positions indicating column position before striking and object and after.
Figure 2:
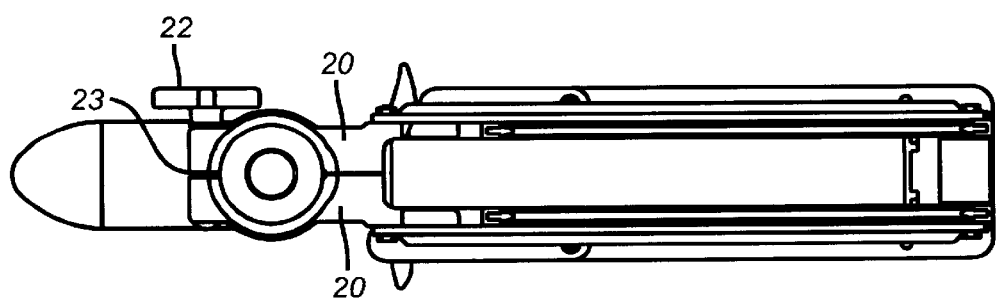
FIG. 2 is a top view looking down on the column along lines 2—2 in FIG. 1 illustrating the clutch feature.
Figure 4:
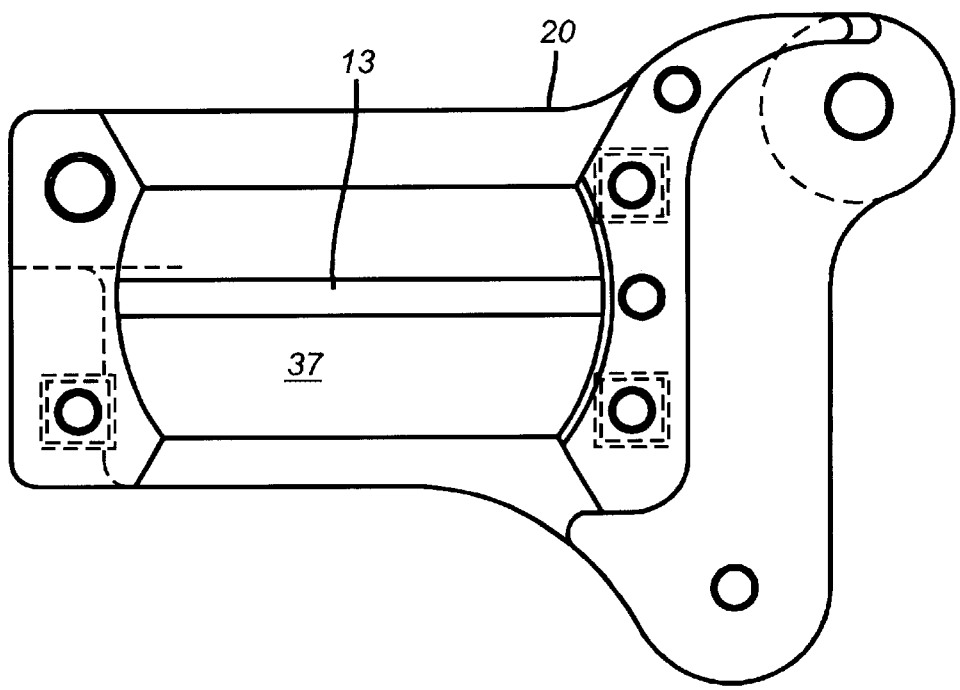
FIG. 4 is the view of FIG. 3 with the ball removed showing the circumferential flat spot in the segmented clamp which aligns with the flat spot on the ball shown in FIG. 3.
Figure 6:
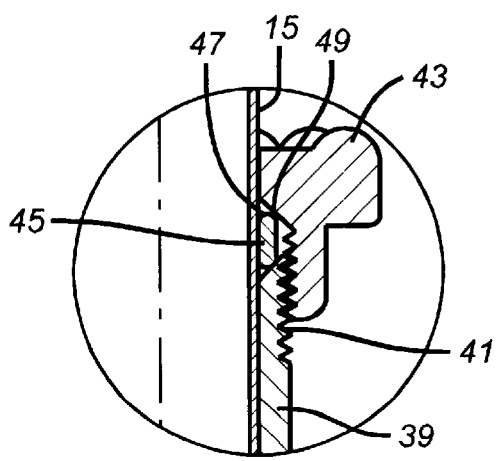
FIG. 6 is a detail of the securement method illustrated in FIG. 5.
Figure 5:
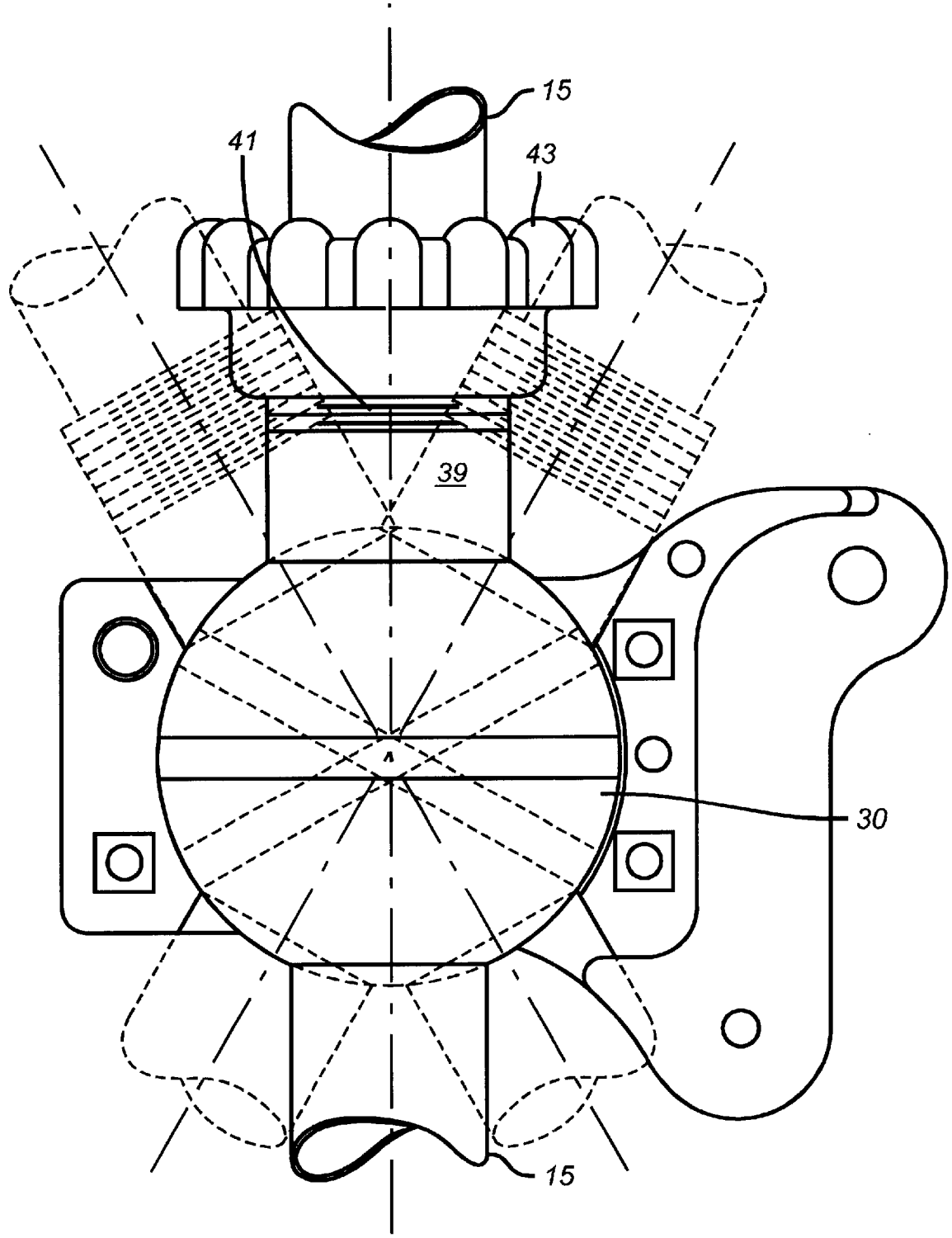
FIG. 5 is a section elevational view illustrating the preferred securement method of the column to the ball structure.

The apparatus is best understood by a review of the figures beginning with FIG. 1. In FIG. 1 a boat is generally illustrated as 12. A known two position trolling motor support assembly 14 is connected to the boat 12 in a known manner. The control at 10 is illustrated above the column 15. Column 15 terminates in the trolling motor 17 which is connected to the propeller 19. As best seen in FIGS. 1 and 2, a knob 22 brings together bracket halves 20. Knob 22 is connected to a bolt 23 which extends through the bracket halves 20 to control the amount of compression the bracket halves 20 exert on ball 30. Ball 30 as shown in FIG. 3 can be of unitary construction or of segmented construction. In the preferred embodiment the ball is made from a polyamide such as nylon including an impregnation of a lubricant such as molybdenum disulfide. Other materials can be used if they meet the criteria for the ball 30 such as the ability to provide a clutching effect without the material galling; a lubrication action to overcome surface defects such as surface corrosion of the socket; a lubrication action to prevent dry sticking; sufficient strength to withstand restricted compression deformation as well as high yield strength for the strength of any threads attached to the balls as will be described below; resistance to water absorption, weathering, galvanic reaction or corrosion and low cost and workability. The column 15 is illustrated in three positions in FIG. 3. The ball 30 has a circumferential flat portion 18 which aligns with circumferential flat portion 13 shown in FIG. 4. The alignment of these two flat portions helps to find the nearly vertical position for the column 15 after the trolling motor 17 has struck an underwater object and has been deflected causing the flat band 18 to become misaligned with the flat portion 13 and the bracket halves 20. It should be noted that FIG. 4 only shows half of the flat band 13 and one of the two bracket halves 20 with the other which is not shown being identical to complete the 360° flat band 13. "Flat" is used to distinguish from the spherical surface of ball 30. Bands 18 and 13 actually form an annular shape distinctive as compared to the spherical surface of the ball 30. The ball 30 can be a unitary construction or it can be of several pieces. In the embodiment shown in FIG. 3 the ball 30 has a bore 31 through which the column passes. In the preferred embodiment, the ball 30 is vertically split as shown in FIGS. 7 and 8. The bore 31 is generally slightly larger than the outer diameter of the column 15. Alignment pins 33 can be used to facilitate assembly of the ball 30 as the alignment pins 33 are inserted into opposing receptacles 35. The segments are then brought together or apart within limits while maintaining the integrity of the bore 31. The depth underwater of the trolling motor 17 can be adjusted by loosening the knob 22 to obtain the proper position and then tightening it sufficiently. The ball 30 with its bore 31 circumscribing the column 15 is squeezed around the column 15 to support it. Additionally, the bracket halves 20 squeeze the ball 30 around the column 15 the ball 30 is also being squeezed within its socket 37, half of which is shown in FIG. 4. An alternative way for releasably securing the column 15 to the ball 30 is illustrated in FIGS. 5 and 6. There the ball 30 is illustrated in numerous positions. In this design the ball 30 has at least one extending pipe 39 which ends in a thread 41. The column 15 fits through the ball 30 as well as the pipe 39. It then extends out the opposite end of the ball 30 as shown in FIG. 5. The attachment mechanism is shown in more detail in FIG. 6. A nut 43 engages the thread 41 and compresses a split ring collet 45. Those skilled in the art will appreciate that the upper end of the pipe 39 shown in FIG. 6 has a taper 49. When the nut 43 is rotated onto the thread 41 the split ring collet 45 is urged downwardly along tapered surface 49 until it wedges against the wall of the column 15 as shown in FIG. 6. To ease release and adjustment, the upper end 47 of the split ring collet 45 is rounded. A tapered section 49 of the nut 43 bears against the upper end 47 of the split ring collet 45.

The significant portions of the apparatus now having been described, the operation becomes apparent to a person of ordinary skill in the art. The flattened portion 18 is aligned with the flattened portion 13 to attain a near vertical orientation for the column 15. The use of the mating flattened circumferential surfaces 13 and 18 is helpful in increasing the interference fit between the ball and the socket. These mating flattened surfaces increase the breakaway pressure as well as provide an aid for relocation of the motor 17 after a breakaway has occurred. Knob 22 is adjusted by the fisherman to raise or lower the breakaway pressure as required to match the varying requirements demanded by underwater obstructions and the torque output of motor 17.

In the preferred embodiment the socket 37 is a two piece aluminum die casting. When the two halves 20 are put together the concave spherical surface is created to match the shape of the ball 30. After assembly, the bracket halves 20 are attachable to the trolling motor mount 14.

Use of this invention allows protection for the motor column 15 regardless of the direction the boat and motor are travelling when the motor strikes the underwater object. The ball and socket system provides 360° protection. The clutching action is achieved through the interference fit of the ball 30 in the socket 37. A slip fit such as illustrated in FIGS. 5 and 6 allows depth adjustment of the motor 17 in the water. While a split ring collet 45 has been illustrated other techniques for securing the column 15 to the bracket halves 20 are within the purview of the invention.

The foregoing disclosure and description of the invention are illustrative and explanatory thereof, and various changes in the size, shape and materials, as well as in the details of the illustrated construction, may be made without departing from the spirit of the invention.

What is claimed is:

1. In combination, an apparatus to support a trolling motor column from a boat including a trolling motor mounted to a column, comprising:

a frame mountable to the boat;

a swivel joint supported by said frame, said swivel joint supporting the column to allow it to be deflected in a plurality of planes;

said swivel joint further comprises a socket supported by said frame and a ball rotatably mounted to said socket;

said ball has a bore therethrough to accept the column for support thereof;

said ball is formed having a flat band on its circumference;

said socket has a matching flat circumferential band; whereupon when said bands are aligned, a near vertical position of the column can easily be determined.

2. The apparatus of claim 1 wherein:

said ball further comprises an extension pipe aligned with said bore in said ball such that the column passes through said bore and said pipe a support mechanism selectively securing the column to said pipe; in different positions for adjustment of depth of the trolling motor.

3. The apparatus of claim 2 wherein:

said support mechanism comprises a compression nut mounted over threads of said pipe and a split ring collet which is pressed between said nut and the column as said nut is threaded on said threads.

4. The apparatus of claim 3 wherein:

said collet has a rounded top in contact with said nut to reduce the possibility of sticking of said collet to said nut when said nut is backed off.

5. The apparatus of claim 1, wherein:

said socket is dimensionally adjustable to allow variation of the force required to turn said ball in said socket upon impact with an underwater object.

6. The apparatus of claim 5 wherein:

said ball further comprises an extension pipe aligned with said bore in said ball such that the column passes through said bore and said pipe; and a support mechanism selectively securing the column to said pipe in different positions for adjustment of depth of the trolling motor.

7. The apparatus of claim 6 wherein said support mechanism comprises a compression nut mounted over threads of said pipe and a split ring collet which is pressed between said nut and the column as said nut is threaded on said threads.

8. The apparatus of claim 5 wherein:

said socket is formed by a pair of opposed bracket halves; and an adjustment rod connected to said halves with a knob at one end to selectively bring together or separate said halves.

9. The apparatus of claim 8 wherein:

said ball is made of a plurality of plastic segments impregnated with a lubricant and split along a plane passing through the center of said bore.

10. The apparatus of claim 9 wherein:

said collet has a rounded top in contact with said nut to reduce the possibility of sticking of said collet to said nut when said nut is backed off.

11. The apparatus of claim 9 wherein:

said segments further comprise alignment guides which allow said segments to be brought together or apart while maintaining the integrity of said bore.

\* \* \* \* \*